United States Patent [19]

Hannover

[11] 3,805,846

[45] Apr. 23, 1974

[54] PIPE FITTING AND PULLING HEAD
[75] Inventor: Finn Hannover, Wilmington, Del.
[73] Assignee: E. I. du Pont de Nemours and Company, Wilmington, Del.
[22] Filed: June 6, 1972
[21] Appl. No.: 260,197

[52] U.S. Cl.............................. 138/109, 138/106
[51] Int. Cl.............................................. F16l 3/00
[58] Field of Search ......... 138/109, 108, 107, 106, 138/97, 178; 61/72.1; 254/134.3; 29/234

[56] References Cited
UNITED STATES PATENTS

| 3,648,734 | 3/1972 | Waite et al. | 138/113 |
| 3,431,947 | 3/1969 | Hines | 138/106 |
| 3,602,263 | 8/1971 | Bremner | 138/97 |
| 3,543,377 | 12/1970 | Bremner | 29/234 |

Primary Examiner—William I. Price
Assistant Examiner—Steven M. Pollard
Attorney, Agent, or Firm—Claude L. Beaudoin

[57] ABSTRACT

A flexible pipe fitting of organic polymeric material such as polyethylene is provided wherein said pipe fitting is of unitary construction and includes a tubular body portion of substantially uniform internal and external diameters having a plurality of flexible members integrally connected to one end of said tubular body and which extend in substantially coaxial relation with said tubular body. A flexible pulling head adapted for pulling tubular lines through pipes also is provided, said pulling head comprising the aforementioned flexible pipe fitting and a support ring disposed internally of the flexible members and a wire cable interconnected to said flexible members and said support ring for connection to a draw cable for pulling a pipe welded to said pipe fitting.

2 Claims, 3 Drawing Figures

PATENTED APR 23 1974 3,805,846

PIPE FITTING AND PULLING HEAD

FIELD OF THE INVENTION

The present invention relates to articles of manufacture of organic polymeric material. More particularly, the present invention is directed to pipe fittings of organic polymeric material especially adapted for pulling tubular members through pipe structures.

BACKGROUND OF INVENTION

Shaped structures such as pipe and pipe fittings of organic polymeric material such as polyethylene have become widely known and used for diverse purposes such as for conveying fluids. Piping systems of organic polymeric material have been found to be desirable especially in view of the ease with which such systems may be fabricated. For example, pipe fittings and pipe may easily be assembled together by utilizing chemical solvents, adhesives or heating treatments for joining these pieces, e.g., polyethylene pipe fittings may be joined to polyethylene pipe by heating the fitting and the pipe before assembly to melt the polyethylene at the region or surface of each piece to be contacted followed by mating the heated surfaces of each piece and cooling the heated pieces whereby to effect fusing of the polyethylene to provide a structure of integral or unitary construction. Such pipe and pipe fittings have been found to be especially useful in relining sewer mains.

Existing sewer mains of, for example, concrete, clay, or cast iron pipe often become unserviceable because a pipe section either decays or is physically damaged as by breaking due to dynamic earth stresses acting thereon. Rehabilitating unserviceable sewers by replacing defective sewer components is extremely difficult and expensive. These drawbacks can be avoided by inserting polyethylene pipe into existing sewer mains. This is easily accomplished by effecting only a few excavations at widely spaced points along a sewer main and penetrating the main at these points and inserting thereinto a continuous length of polyethylene pipe. These lengths of polyethylene pipe may be jointed together at their respective ends by conventional fusing techniques to provide a continuous pipe encompassed within the existing sewer main.

A method and apparatus for relining sewer pipe are disclosed in, for example, U.S. Pat. No. 3,602,263. The method described in the aforementioned patent requires, in part, inserting a tubular liner into an open end of a sewer pipe and pulling the tubular liner through the sewer pipe by means of a vibrating pulling head device that is mechanically attached to the end of the tubular liner. The vibrating pulling head is secured to one end of a suitable cable which is attached at its other end to a winch, and actuation of the winch for winding the cable thereon transmits a tractive force for pulling the tubular liner through the sewer pipe. The pulling head device, denominated a vibrating towing head, is more fully described in U.S. Pat. No. 3,543,377.

A significant drawback of the relatively large and complex metal towing head device described in the immediately aforementioned patent is that it is difficult to advance the device through crooked and misaligned sewer sections. Attempts to pull such towing head devices through misaligned sewer sections often results in the tearing and breaking of the old sewer sections accompanied by placing great strain on the pulling cable and winch device which, in turn, often results in serious delays in the relining operation because of broken pulling cables, torn and injured towing head devices and the need to excavate to the sewer main for removing obstructions therein. Accordingly, a principal object of the present invention is to provide a new pulling head device adapted to be connected directly to the end of a tubular liner for advancing said liner through a sewer main.

THE INVENTION

According to the present invention there is provided an article of manufacture comprising a flexible pipe fitting of organic polymeric material comprising a tubular body portion having a plurality of flexible members integrally connected at one end thereof and extending therefrom in substantially coaxial relation.

In one preferred embodiment, the present invention includes a flexible pulling head assembly comprising a flexible pipe fitting of organic polymeric material having tubular body portion and a plurality of flexible members integrally connected at one end to said tubular body and extending from said tubular body in substantially coaxial relation, including means disposed internally of said flexible members in cooperative association with purchase means operatively connected to said flexible members adapted to urge said flexible members inwardly to provide a truncated cone-shaped configuration at the end of said pipe fitting upon exerting a tensile draw force on said purchase means.

DETAILED DESCRIPTION

The nature and advantages of this invention will be more clearly understood by the following description and the several views illustrated in the accompanying drawings wherein like reference characters refer to the same parts throughout the several views and in which.

Figure 1:
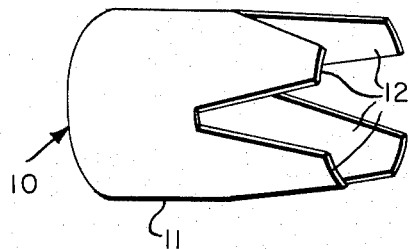
FIG. 1 is a schematic illustration in perspective of the pipe fitting of the invention.

The flexible pipe fitting herein disclosed in illustration of the invention is depicted in FIG. 1. As shown in FIG. 1, flexible pipe fitting 10 includes a tubular body portion 11 having a plurality of flexible members 12 at one end thereof. The flexible members 12 are each integrally connected to tubular body 11 and extend from tubular body 11 in a manner substantially coaxially therewith; that is, the flexible members 12 are an extension of tubular body 11. Flexible pipe fitting 10 is made of organic thermoplastic polymeric material such as, for example, polymers or copolymers of ethylene.

Figure 3:
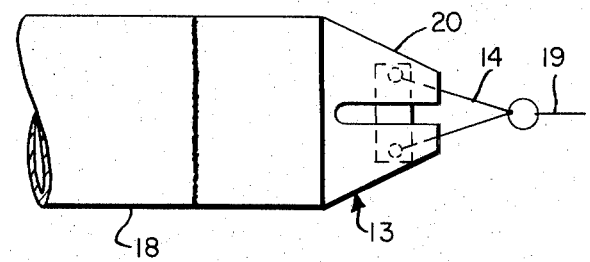
FIG. 3 is a schematic illustration showing a principal use of hhe pipe fitting and pulling head assembly of the invention.
Figure 2:
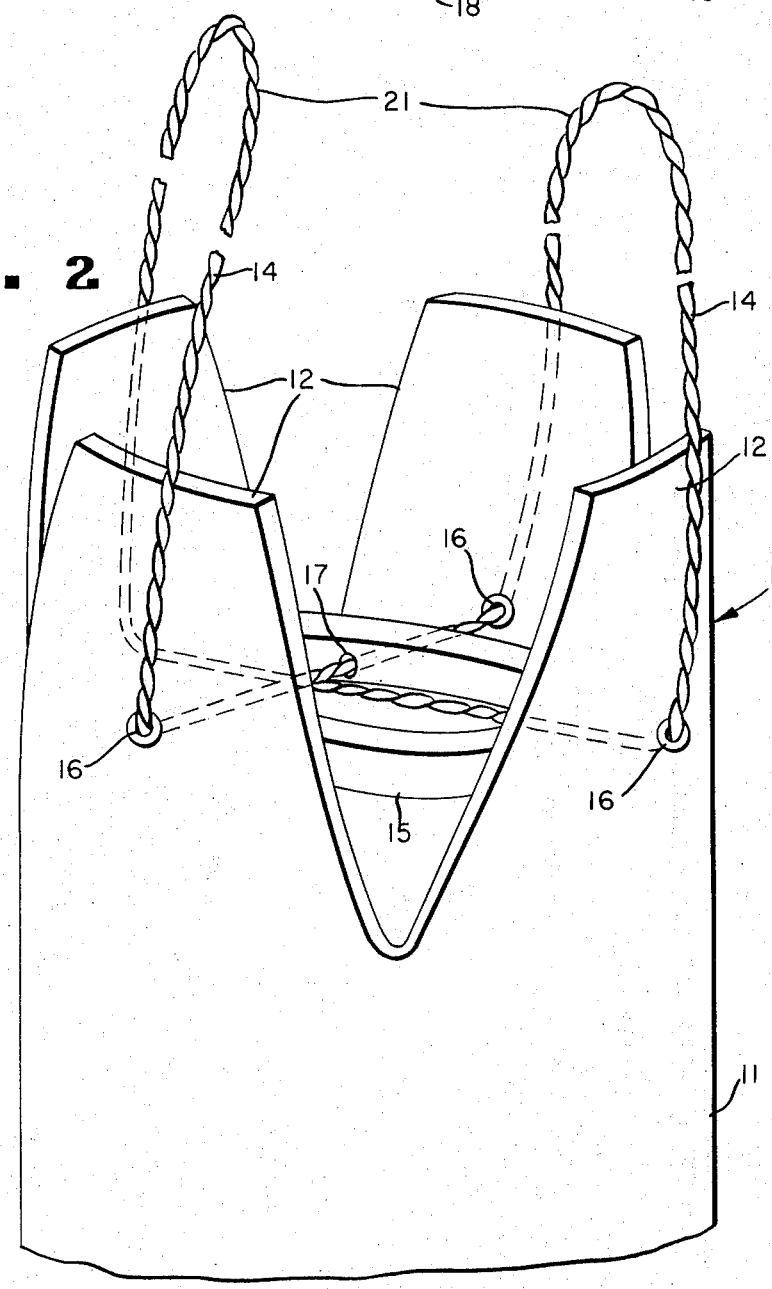
FIG. 2 is a schematic view showing a pulling head assembly of the invention.

The pipe fitting is depicted in FIG. 2 in the form of a pulling head assembly 13 which comprises, in combination, pipe fitting 10, purchase means 14 and support ring member 15. The purchase means 14 shown in FIG. 2 is a continuous cable such as a metallic cable which extends through suitable openings 16 in flexible members 12 and through suitable openings 17 in support ring member 15 that are in registry with openings 16. Cable 14 is preferably a single cable which is threaded through openings 16 and 17 to provide two loops 21 as shown in FIG. 3; the cable is preferably joined together at its ends to provide a continouos cable extending through the aforementioned apertures. Suitable grommets may be placed in each aperture 16 so as to provide reinforcing means and a protective surface in direct contact with purchase means 14. Support ring member 15 provides means disposed internally of flexible members 12 for supporting cable 14 and restricting the extent of inward movement of deflection of flexible members 12 when placing pulling head assembly 13 in use, as described below.

Pulling head assembly 13 is utilized in the manner shown in FIG. 3 by welding in a known manner the end of tubular body 11 of pipe fitting 10 to a pipe 18 of organic polymeric material corresponding to that of pipe fitting 10, e.g., polyethylene. A main draw cable 19 is attached to both loops of purchase means 14, and a tractive force applied to draw cable 19 will pull pipe 18 in the direction of draw, as through a sewer main in the manner described hereinabove. As shown in FIG. 3, a pulling force on cable 19 exerts a tension force on pulling head assembly 13 causing the flexible members 12 of pipe fitting 10 to deflect inwardly thereby to provide a truncated cone-shaped leading surface 20.

A significant advantage of the flexible plastic pipe pulling head is that it can be fused to a pipe in the same way that all other pipe sections are put together. Since it is almost as flexible as the pipe itself it can move with much greater ease both through crooked sewer lines and between offset or misaligned sewer sections. Furthermore, since the flexible head deforms into a truncated cone as the tension on the draw cable is increaeed, it also will throttle the sewage flow when pulled in the downstream direction in a sewer main and thus tend to fill up the sewer behind it. Since polyethylene is lighter than water, this again wlll tend to float the liner through the sewer, thus decreasing the required pulling forces. On the other hand, as soon as the tension on the cable is relaxed, the flexible head cone opens up and resumes its tubular shape to permit the sewage flow to pass therethrough.

I claim:

1. A flexible pulling head which comprises a flexible pipe of organic polymeric material having a tubular body portion adapted to be secured at one end by heat fusion to a tubular pipe of organic polymeric material and a plurality of flexible members integrally connected to the other end of said tubular body and extending in substantially coaxial relation therewith, restraining means disposed internally of said flexible members, and purchase means operatively connected to said flexible members and to said restraining means and adapted to urge said flexible members inwardly against said restraining means to provide a truncated cone-shaped configuration at the end of said pulling head upon exerting a tensile force on said purchase means.

2. The flexible pulling head of claim 1 wherein said organic polymeric material is a polymer or copolymer of ethylene.

* * * * *